Sept. 15, 1970  L. R. JOHNSON  3,528,215
RESTRAINING DEVICE
Filed March 22, 1968

INVENTOR
LEE R. JOHNSON
BY
ATTORNEYS

United States Patent Office 3,528,215
Patented Sept. 15, 1970

3,528,215
RESTRAINING DEVICE
Lee R. Johnson, Rte. 1, Box 52,
Gatesville, Tex. 76528
Filed Mar. 22, 1968, Ser. No. 715,272
Int. Cl. B68b 1/02, 1/08
U.S. Cl. 54—24                                          5 Claims

ABSTRACT OF THE DISCLOSURE

A halter for animals, such as cattle, which includes an elliptical body positionable on the head of the animal and having flexible means positionable about the back of the head of the animal for holding the elliptical body thereon and permitting pivotal movement of the elliptical body about an axis spaced rearwardly of the body to cause a forward pull exerted on the top portion of the elliptical body to pivot said body and cause the bottom portion thereof to exert an upwardly and rearwardly directed force on the bottom portions of the lower jaw of the animal and a forwardly and downwardly directed force on the back of the head of the animal.

---

This invention relates to animal restraining devices and more particularly to halters.

An object of this invention is to provide a new and improved halter for cattle and the like which causes sensitive portions of the lower jaw to be subjected to pressure and thus pain when a forward pull is imparted on the upper portion of the halter which is relieved when the animal steps forwardly in the direction of the force applied to the halter.

Another object is to provide a halter which is of simple structure and which is easily and quickly positionable on the animal.

A further object of the invention is to provide a new and improved halter having a rigid elliptical body positionable on the head of the animal and having means at its top portion for connecting a lead or guide member thereto and means at the sides of the body for connecting a flexible member to opposite side portions of the body, the flexible member being positionable about the back of the head of the animal to hold the body on the head.

Still another object is to provide a halter of the type described wherein the flexible means permits pivotal movement of the body about an axis spaced rearwardly thereof.

Still another object is to provide a halter of the type described wherein the flexible means comprises a pair of chain sections adjustably connectible to one another to permit the halter to be used with animals whose heads are of different dimensions.

Still another object is to provide a halter of the type described wherein the distance between the point of pivotal connection of the flexible means to the body is spaced a distance from the point of connection of a guide or lead member to the upper portion greater than the distance between the axis and the bottom portion of the body to increase the relative force with which the lower portion engages the lower jaw of the animal upon a given forward force exerted on the said guide member.

Additional objects and advantages of the invention will be readily apparent from the reading of the following description of a device constructed in accordance with the invention, and reference to the accompanying drawings thereof, wherein.

Figure 1:
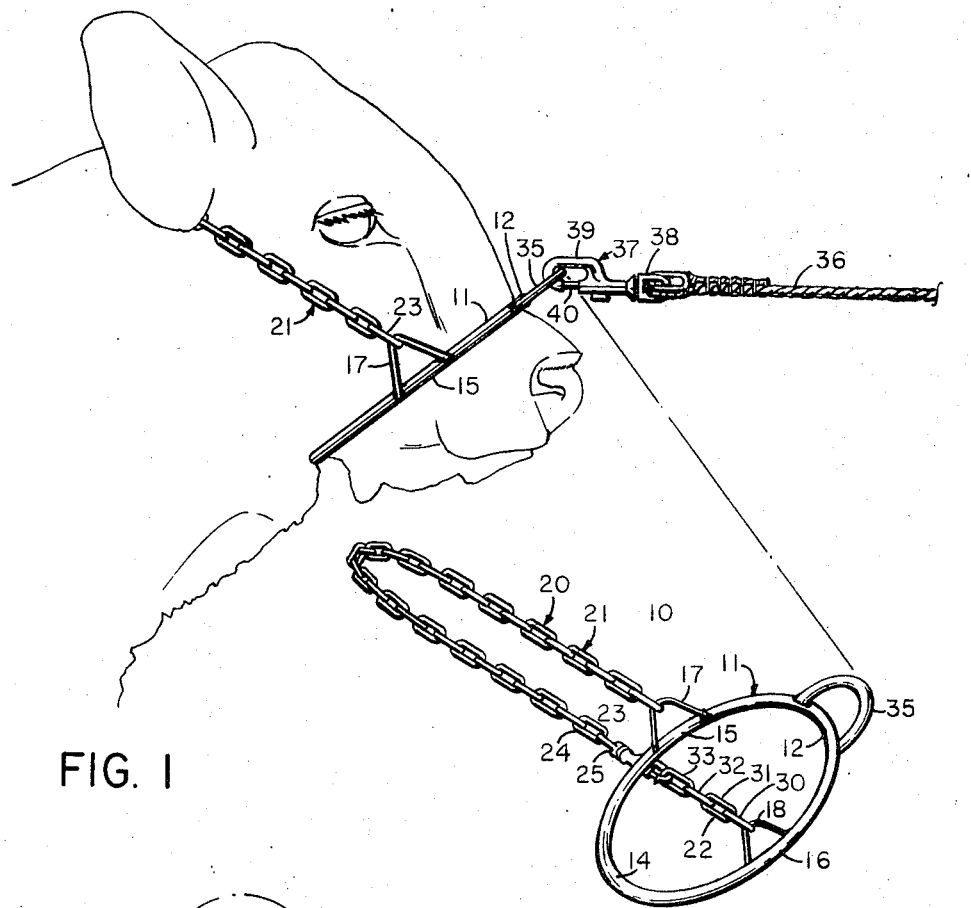
FIG. 1 is a side view showing the halter embodying the invention positioned on the head of a steer, and forward force being applied to the guide member connected to the halter.

Referring now to the drawings, the halter 10 includes a closed elliptical body 11 which is adapted to be positioned on the forward portion of the head of the animal with the top portion 12 of the body being positioned above the nose of the animal, the bottom portion 14 below the lower jaw and the side portions 15 and 16 at the sides of the jaws. The side portions 15 and 16 of the body 11 are provided with rearwardly extending brackets or loops 17 and 18, respectively, which extend rearwardly therefrom and are welded thereto.

A flexible retainer member 20 for holding the body on the head of the animal includes two chain sections 21 and 22. The end link 23 of the chain section 21 has the bracket 17 extending therethrough and is movable thereon, and the opposite end link 24 thereof is secured to the swivel base 25 of a conventional swivel connector 26. The connector includes a substantially C-shaped body 27 and a bolt 28 slidable in a suitable bore of the body which is biased toward its closed position, illustrated in the drawings, wherein it closes the open throat of the C-shaped body. The bolt has a lug 29 which extends outwardly through a suitable slot of the body. The other chain section, which may include a number of links 30, 31, 32 and 33, has its end link 30 secured to the bracket 18 which extends therethrough.

Figure 2:
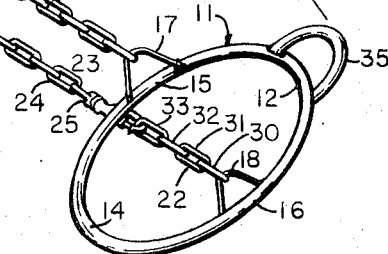
FIG. 2 is a perspective view of the halter.
Figure 3:
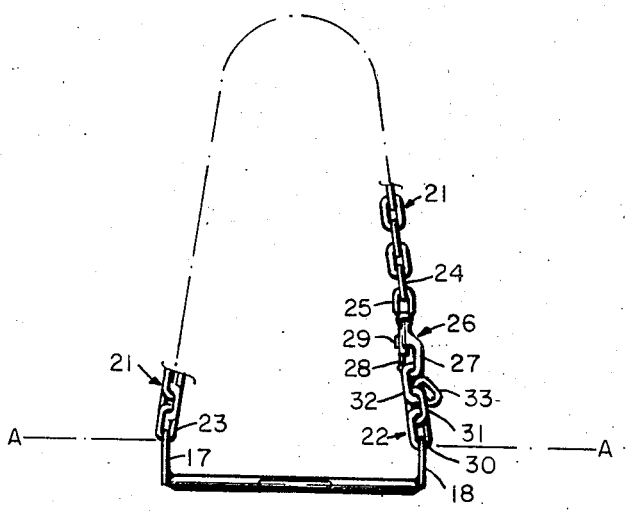
FIG. 3 is a top view of the halter.

It will be apparent that the effective length of the retainer member may be adjusted by choosing an appropriate link of the chain section 22 to which to connect the chain section 21 by means of the swivel connector. The shorter the head of the animal, the shorter must be the length of the retainer member. For example, if the head of the animal is relatively large, the swivel connector will be connected in the usual manner, as illustrated in FIG. 2, to the end link 33 and if the head of the animal is somewhat shorter, it is connected to one of the other links, for example, the next link 32, as illustrated in FIG. 3.

The top portion 12 of the body 11 is provided with an upwardly extending bracket or loop 35 to which a lead member, such as a rope 36, is connectible by a swivel connector 37 secured to the end of the lead member. The swivel connector may be of the same type as the swivel connector 22 and includes a swivel base 38 and a C-shaped body 39 whose throat is closable by a bolt 40 which is biased toward closed position by a spring. In use, the body 11 is moved over the front part of the head of the animal, its top portion 12 being disposed on the head upwardly of the nose of the animal and the bottom portion 14 being disposed below its lower jaw. The chain section 21 is then looped about the head of the animal behind its ears, as illustrated in FIG. 1, and its free end is then connected by means of the swivel connector 26 to an appropriate one of the links of the chain section 22. When it is then desired to lead the animal, the flexible lead member 32 is connected to the loop or bracket 35 by means of the swivel connector 37. When a forward pull is then imparted to the lead member, if the animal does not immediately move forwardly, the body 11 is pivoted in a clockwise manner, as seen in FIG. 1, about the axis A at the location of the pivotal engagement of the links 23 and 30 of the chain sections 21 and 22, respectively, with the brackets 17 and 18, respectively. The axis A is spaced upwardly and rearwardly of the central plane of the body so that the top portion 12 of the body exerts a downwardly and forwardly directed force on the upper jaw of the animal rearwardly of its nose and simultaneously the bottom portion 14 of the body exerts an upwardly and rearwardly directed force on the lower jaw of the animal. Simultaneously, the rear portion of the chain section 21, which extends about the back of the head of the animal, exerts a forwardly and downwardly directed force to the back of the head. Since the spacing of the axis of pivotal movement of the body 11 rearwardly of the body causes the path of pivotal movement of the top portion to be at a greater angle downwardly than would be the case if the axis of pivotal movement were located in the plane of the body itself, the top portion of the ring does not tend to slip over the nose of the animal. The underside of the lower jaw of the animal is relatively tender, or sensitive, and any such pivotal movement and force applied to the top portion of the ring of the body causes pain to be inflected on the animal. The animal quickly learns that this pain is relieved if it moves forwardly thus decreasing the pulling force on the lead member 32 and the force with which the body is being pivoted.

The loops 17 and 18 are preferably located at the midpoints of the side portions 15 and 16 of the body in order that a relatively great upward and rearward force be exerted on the sensitive lower jaw of the animal, it being apparent that a mechanical advantage of greater than one is obtained by such location of the loops since the distance from the axis A to the location of engagement of the swivel connector 37 with the top loop 35 is greater than the distance between the axis A and the location of engagement of the lower portion of the body with the lower jaw of the animal. The brackets or loops 17 and 18 are preferably secured to the outer side surface of the side portions to space the brackets from the sides of the head of the animal.

It is found that animals which have not been broken to the halter or unruly animals are very quickly broken to the halter and follow whenever a forward pull is exerted on the lead member since the animal quickly learns that forward movement relieves the pain which is being exerted primarily on its sensitive lower jaw.

It will now be seen that a new and improved halter for cattle and the like has been illustrated and described which is of simple structure and is easily and quickly positioned and fastened on the head of the animal and that, while the halter subjects primarily the lower portions of the lower jaw of the animal to pressure and pain if the animal does not move forwardly when a forward pull is applied to the halter by means of a lead or guide member, it does not contain any sharp points or edges which would injure the animal.

It will further be seen that the halter includes a substantially elliptical body 11 which is positionable on the head of the animal and that flexible means, such as the two chain sections extend between the side portions of the elliptical body and about the back of the head of the animal for holding the body on the head, and that the opposite ends of such flexible means are pivotally connected, as by means of the brackets 17 and 18, to the side portions of the body, and that a means, such as the bracket or loop 35, is provided on the top portion of the body for connecting a lead member to the top portion of the elliptical body so that a forward pull or force exerted by such guide member on the loop 35 will cause the elliptical body to pivot about the axis of its pivotal connections with the flexible means to cause the bottom portion of the elliptical body to exert an upwardly and rearwardly directed force on the sensitive lower jaw of the animal and to cause the flexible means such as the chain section 21 to exert a downward and forward force on the back of the head of the animal.

It will further be seen that the axis of pivotal movement of the body on the head of the animal is located at the locations of the connections of the chain sections with the brackets or loops 17 and 18 so the axis is spaced rearwardly of the body on the head of the animal.

It will further be seen that the force with which the bottom portion of the elliptical body is urged against the lower jaw of the animal is increased due to the fact that the distance between the point of connection of the guide member and the axis of pivotal movement of the body on the head of the animal is greater than the distance between such axis and the bottom portion of the body whereby a mechanical advantage is secured thereby.

It will further be seen that by the use of chains for the flexible member the chain links themselves inflict some pain upon the animal if it does not move forwardly when a forward pull is exerted on the guide member or attempts to move rearwardly.

It will further be seen that since the body 11 is a rigid member and the loop or bracket 35 extends upwardly therefrom and is rigid therewith, the animal may also be easily caused to turn to one side or the other since the body exerts forces on the sides of the jaws of the animal at a location well forward on the head of the animal when a pull is exerted on the loop so that a relatively great force is exerted on the neck of the animal and the animal cannot effectively hold its head from turning.

It will further be seen that, if desired, the end links 23 and 30 of the two chain sections could be welded directly to the side portions of the body 11 but the use of the brackets 17 and 18 is preferred since they permit the axis A of pivotal movement to be spaced farther from the body.

It will also be apparent that if a greater degree of adjustability of the flexible member is desired, the connector 26 may be secured to the end link 33 of the short chain section 22 instead of to the end link 24 of the long chain section 21 and the connector could then be selectively secured to any one of the large number of links of the chain section 21.

It will further be seen that while the body 11 is preferably of elliptical configuration which conforms somewhat to the cross-sectional configuration of the head of the animal at the location of the body thereon, the body 11 could be circular or even polygonal in form.

It will also be seen that while the body 11 is preferably in the form of a continuous or closed member, for greatest strength, it could be split or provided with a gap at the top or bottom portion thereof as long as the body provides an aperture in which the front portion of the head is receivable.

The foregoing description of the invention is explanatory only, and changes in the details of the construction illustrated may be made by those skilled in the art, within the scope of the appended claims, without departing from the spirit of the invention.

I claim:

1. A halter including: a body positionable on the head of an animal rearwardly of its nose, said body having top, bottom and side portions, the top portion being positionable above and rearwardly of the nose of the animal and the bottom portion being positionable below its lower jaw; bracket means extending rearwardly from said side portions of said body; a flexible member comprising a pair of chain sections, said chain sections each having one end link secured to one of said brackets, one of said chain sections having a connector means secured to its other end link for connecting said other end link to a link of the other of said chain sections, said flexible member being positionable about the back of the head of an animal for holding said body on the head, said end links being secured to said brackets for pivotal movement about an axis spaced rearwardly from said body; and a loop secured to the said top portion of said body and extending upwardly therefrom to which a lead member may be connected whereby a forward pull exerted on said loop will cause said body to pivot on the head about the said axis and cause said bottom portion to exert an upwardly and rearwardly directed force on the lower jaw and the flexible means to exert a downwardly and forwardly directed force on the back of the head.

2. The halter of claim 1, whereby said top portion is engageable with the head of the animal rearwardly of its nose to impart a downwardly and forwardly directed force to the head when a forward force is exerted on said top portion of said body.

3. The halter of claim 2, wherein said connector means is connectible to any one of the links of said other of said chain sections to permit adjustment of the length of the flexible member.

4. A halter including: a body positionable on the head of an animal rearwardly of its nose, said body having top, bottom and side portions, the top portion being positionable above and rearwardly of the nose of an animal and the bottom portion being positionable below its lower jaw, said body being annular in configuration; and flexible means extending between said side portions and having opposite ends pivotally connected to said side portions at locations spaced rearwardly of the body whereby the axis of pivotal connection of said flexible means is spaced rearwardly of said body, said flexible means being positionable about the back of the head of the animal for holding said body on the head, the top portion of said body having connector means extending upwardly therefrom to which a lead member is connectible whereby a forward pull exerted on the connector means tends to cause said body to pivot on the head about the axis of pivotal connection of the flexible means with said side portions and said bottom portion to exert an upwardly and rearwardly directed force on the lower jaw and the flexible means to exert a downwardly and forwardly directed force on the back of the head.

5. The halter of claim 4, wherein said flexible means includes a pair of chain sections each secured at one of its ends to a side portion, and connector means connected to one of said chain sections at its other free end for connecting its free end to the other of said chain sections.

References Cited

UNITED STATES PATENTS

| | | | |
|---|---|---|---|
| 309,611 | 12/1884 | Du Bois | 54—24 |
| 1,005,666 | 10/1911 | Speck | 54—24 |
| 1,804,655 | 5/1931 | Swanjord | 54—24 |
| 2,457,246 | 12/1948 | Lawrence | 54—24 |
| 3,000,351 | 9/1961 | De Melo | 119—130 |

ALDRICH F. MEDBERRY, Primary Examiner

U.S. Cl. X.R.

54—15